UNITED STATES PATENT OFFICE.

TRAUGOTT SANDMEYER, OF BASLE, SWITZERLAND, ASSIGNOR TO JOHN R. GEIGY & CO., OF SAME PLACE.

GREENISH-BLUE DYE.

SPECIFICATION forming part of Letters Patent No. 564,801, dated July 28, 1896.

Application filed March 25, 1896. Serial No. 584,740. (Specimens.)

*To all whom it may concern:*

Be it known that I, TRAUGOTT SANDMEYER, a citizen of the Swiss Confederation, residing at Basle, Switzerland, have invented certain new and useful Improvements in a Process for the Production of a Greenish-Blue Dyestuff, of which the following is a specification.

This invention relates to an improved process of producing a new coloring-matter which is of a very pure greenish-blue color and which dyes wool in an acidulated bath, giving shades which are characterized by a remarkable fastness against the action of alkalies. The said coloring-matter belongs to the class of dyestuffs known as "malachite green." In German Patent No. 80,982 is described a process of producing the orthosulfo-acid of the coloring-matter, generally known under the name of "malachite green." At the same time I have made the surprising observation that by the entrance of the sulfo group into the molecule in the ortho position to the methane carbon the coloring-matters obtain all the excellent qualities of the so-called "patent-blue" dyestuffs, such as blue tone, fastness against the action of alkalies, and the property of furnishing very even shades on wool. It was thus shown that the properties of the coloring-matters belonging to the patent-blue series, as well as those of the malachite green, are based upon the same fact, namely, upon the above-mentioned ortho position of the sulfo group. From this observation it was next concluded that similar coloring-matters may be obtained by starting from the orthosulfo-acid of the benzaldehyde, which was then unknown, but which I have succeeded in obtaining by heating the orthochlorbenzaldehyde in an autoclave with an aqueous solution of neutral sulfite of soda at a temperature of 190° to 200° Celsius for about six hours. The thus-obtained orthosulfo-acid of benzaldehyde can be very easily condensed with the different alkylated aromatic amins and their sulfo-acids. The leucosulfo-acids thus obtained furnish by oxidation very valuable greenish-blue coloring-matters of a remarkable fastness against the action of alkalies.

The process described in the German Patent No. 80,982 before referred to consists in the condensation of tetramethyldiamidobenzhydrol with metanilic acid, elimination of the amido group by the reaction of Griess, and oxidation of the thus-obtained leucosulfo-acid, according to the following equations:

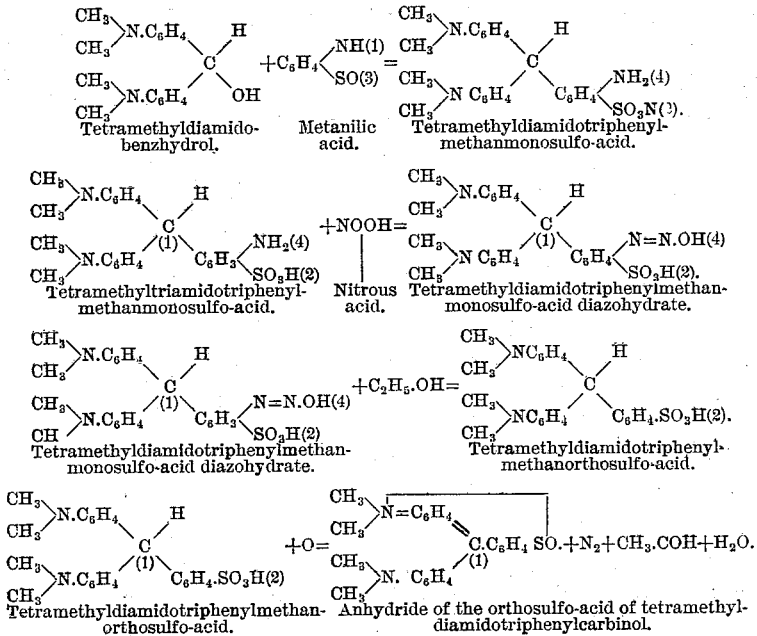

My improved process differs from the process described by starting from the new orthosulfo-acid of the benzaldehyde, which is condensed with a tortiary amin or its sulfo-acid. If we would start from dimethylanilin and condense the same with the orthosulfo-acid of the benzaldehyde, the same leucosulfo-acid would be obtained as by the process described in the German Patent No. 80,982, as set forth in the above equations. When, however, instead of the dimethylanilin any other tortiary amin or its sulfo-acid is employed, the resulting leucosulfo-acids furnish after oxidation a series of new patentable coloring-matters which it would be impossible to obtain by the process described in German Patent No. 80,982, as the latter furnishes only such coloring-matters which contain the group—

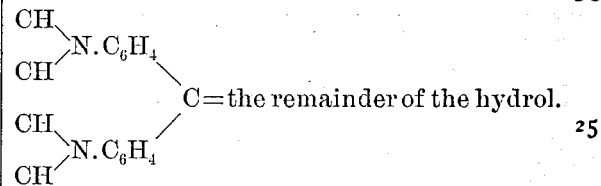

To show how the reaction takes place in my improved process, the following equations show the manner in which my improved coloring-matter is formed:

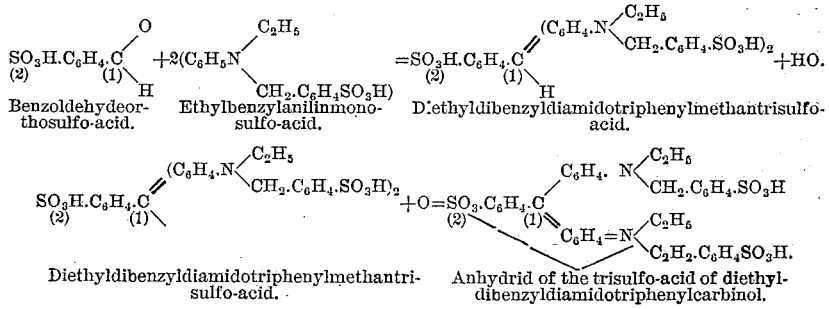

The thus-obtained coloring-matter forms a copper-like powder, readily soluble in hot and cold water and soluble in ordinary alcohol. It dissolves in concentrated sulfuric acid, giving a brown solution which turns to green by dilution with water. By addition of soda-lye or acetic acid the solution does not change its color. Mineral acids make it turn from blue to green and yellow. The coloring-matter dyes well in an acidulated bath in very pure and even greenish-blue shades distinguished for their fastness against the action of alkalies. The new dyestuff has probably the following formula:

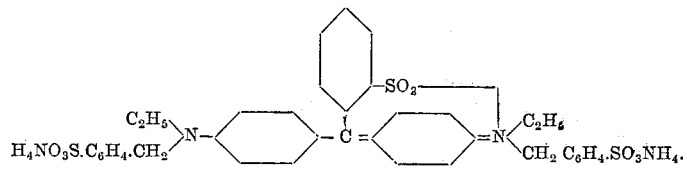

*Example I.*—One hundred and eighty-six kilograms of a solution containing ten per cent. of the above-mentioned orthosulfo-acid of benzaldehyde are boiled with thirty kilograms of dimethylanilin and three kilograms of sulfuric acid for fifteen hours. Carbonate of soda is then added to the solution and the dimethylanilin which has remained unacted upon is distilled off. The solution is now diluted up to five thousand liters, acidulated by hydrochloric or acetic acid and the product which in chemical language may be called the "leucosulfo-acid" of the new coloring-matter is then submitted by the addition of a calculated quantity of peroxid of lead to an oxidizing process analogous to that which is generally used for converting the leuco bases of malachite green or of similar dyestuffs into their corresponding coloring-matters. The sulfate of lead is next filtered off and the solution, which has been made alkaline by addition of ammonia, evaporated by dryness.

*Example II.*—One hundred and eighty-six kilograms of a solution containing ten per cent. of the orthosulfo-acid of benzaldehyde are boiled with sixty kilograms of ethylbenzylanilin monosulfo-acid for fifteen hours. The solution after having been diluted up to five thousand liters and acidulated with hydrochloric acid is oxidized by addition of one hundred kilograms of a paste containing thirty per cent. of peroxid of lead, next saturated with ammonia, filtered, and evaporated to dryness.

In the above examples the dimethylanilin may be replaced by the diethylanilin and the methylbenzylanilin monosulfo-acid may be substituted for the ethylbenzylanilin monosulfo-acid, the dyes obtained by such substitution being in general analogous or similar in their dyeing and chemical properties to those which are particularly described in the foregoing examples.

Having thus described my invention and the manner by which the same is to be performed, I claim as new and desire to secure by Letters Patent—

1. The process herein described of producing a greenish-blue dyestuff, which consists in condensing the orthosulfo-acid of benzaldehyde with an alkylated benzylanilin monosulfo-acid and then oxidizing the thus-obtained leucosulfo-acid into the corresponding dyestuff, substantially as set forth.

2. The new greenish-blue dyestuff herein described, which is obtained as a copper-like powder, readily soluble in hot and cold water and soluble in ordinary alcohol, dissolving in concentrated sulfuric acid with a brown color turning to green by dilution with water, and producing on wool in an acidulated bath very pure and even greenish-blue shades distinguished for their fastness against the action of alkalies, substantially as set forth.

In testimony that I claim the foregoing as my invention I have signed my name in presence of two subscribing witnesses.

TRAUGOTT SANDMEYER.

Witnesses:
CHARLES BURCKHARDT,
GEORGE GIFFORD.